United States Patent
Goeldner et al.

(10) Patent No.: US 11,850,937 B2
(45) Date of Patent: Dec. 26, 2023

(54) FLANGE COVER, CONVEYOR MODULE ARRANGEMENT, OPERATING MEDIUM CONTAINER AND MODULAR OPERATING MEDIUM CONTAINER SYSTEM

(71) Applicant: Bayerische Motoren Werke Aktiengesellschaft, Munich (DE)

(72) Inventors: Julius Goeldner, Dingolfing (DE); Bernhard Maier, Bruckberg (DE); Benjamin Schimpf, Winkelhaid (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/011,340

(22) PCT Filed: Jul. 5, 2021

(86) PCT No.: PCT/EP2021/068475
§ 371 (c)(1),
(2) Date: Dec. 19, 2022

(87) PCT Pub. No.: WO2022/008420
PCT Pub. Date: Jan. 13, 2022

(65) Prior Publication Data
US 2023/0302894 A1   Sep. 28, 2023

(30) Foreign Application Priority Data
Jul. 7, 2020 (DE) .................... 10 2020 117 903.0

(51) Int. Cl.
*B60K 15/03* (2006.01)
(52) U.S. Cl.
CPC .... *B60K 15/03* (2013.01); *B60K 2015/03453* (2013.01)

(58) Field of Classification Search
CPC .............. B60K 15/06; B60K 15/05; B60K 2015/03453; B65D 90/10; F01N 3/20;
(Continued)

(56) References Cited

U.S. PATENT DOCUMENTS 3,021,855 A * 2/1962 Cartwright .......... B60K 15/077
137/142
8,424,565 B2 * 4/2013 Solorio ................. B60K 15/03
137/565.17
(Continued)

FOREIGN PATENT DOCUMENTS

DE        9319543 U1    2/1994
DE    299 18 789 U1    4/2000
(Continued)

OTHER PUBLICATIONS

International Search Report (PCT/ISA/210) issued in PCT Application No. PCT/EP2021/068475 dated Nov. 4, 2021 with English translation (six (6) pages).
(Continued)

*Primary Examiner* — Grant Moubry
(74) *Attorney, Agent, or Firm* — Crowell & Moring LLP

(57) ABSTRACT

A flange cover has multiple receptacles for receiving guide bars for a conveyor module at different angles. Further, a conveyor module arrangement has a flange cover of this kind, an operating medium container has a conveyor module arrangement of this kind, and a modular operating medium container system has a plurality of operating medium containers of this kind.

17 Claims, 2 Drawing Sheets

(58) Field of Classification Search
CPC ............... F01N 3/2066; F01N 2610/02; F01N 2610/1413; F01N 2610/1406
See application file for complete search history.

(56) References Cited

U.S. PATENT DOCUMENTS

| | | |
|---|---|---|
| 2012/0234414 A1 | 9/2012 | Powell |
| 2013/0263938 A1 | 10/2013 | Harr et al. |
| 2015/0139728 A1 | 5/2015 | Busley et al. |
| 2015/0198071 A1* | 7/2015 | Hudgens ............... F01N 3/2066 210/295 |
| 2021/0207565 A1* | 7/2021 | Ikeya .................... B60K 15/03 |

FOREIGN PATENT DOCUMENTS

| | | | | |
|---|---|---|---|---|
| DE | 10 2010 024 554 A1 | 12/2011 | | |
| DE | 102015004704 A1 * | 10/2015 | ............. | B60K 15/03 |
| EP | 1 925 354 A1 | 5/2008 | | |
| EP | 2 876 209 A1 | 5/2015 | | |

OTHER PUBLICATIONS

German-language Written Opinion (PCT/ISA/237) issued in PCT Application No. PCT/EP2021/068475 dated Nov. 4, 2020 (five (5) pages).
German-language Search Report issued in German Application No. 10 2020 117 903.0 dated Mar. 4, 2021 with partial English translation (15 pages).

\* cited by examiner

FLANGE COVER, CONVEYOR MODULE ARRANGEMENT, OPERATING MEDIUM CONTAINER AND MODULAR OPERATING MEDIUM CONTAINER SYSTEM

BACKGROUND AND SUMMARY OF THE INVENTION

The technology disclosed herein relates to a flange cover, a conveyor module arrangement, an operating medium container and a modular operating medium container system.

Operating medium containers typically have a housing in which liquid fuel can be stored. Similarly, other liquid operating media, such as water or additives for reducing contaminants, can be stored therein. A conveyor module, in which components such as pumps or filters are located, is frequently provided in the operating medium container. In principle, it is possible to fasten such a conveyor module to the base of the operating medium container but this is not always the best option. Operating medium containers typically have a hand hole which is closed by a flange cover.

It is a preferred object of the technology disclosed herein to reduce or to remedy at least one drawback of a previously known solution, or to propose an alternative solution. In particular, it is a preferred object of the technology disclosed herein to provide an alternative fastening for a conveyor module, in which a rigid fastening to the base is avoided. Further preferred objects can result from the advantageous effects of the technology disclosed herein. The objects are achieved by the claimed invention.

The technology disclosed herein relates to a flange cover for closing a hand hole, in particular a hand hole of an operating medium container. At least one first receiver for receiving a guide bar of a first operating medium container and a second receiver for receiving a guide bar of a second operating medium container are provided on the flange cover. The first operating medium container and the second operating medium container differ regarding the housing geometries thereof.

By way of such a flange cover, a conveyor module can be fastened in an operating medium container to a guide bar which in turn is received in one of the receivers of the flange cover and fastened therein. The flange cover can close a hand hole of the operating medium container and is typically fastened at the same time. The conveyor unit is thus fastened via the guide bar and the flange cover to the operating medium container and an undesired movement of the conveyor unit in the operating medium container can be advantageously prevented thereby.

The housing geometries of the operating medium containers can define, in particular, the shape of the respective housing of the operating medium container. In particular, a hand hole can be configured in each housing, the hand hole being arranged relative to a base of the operating medium container. In particular, different angles of the hand hole relative to the base can be configured with different housing geometries. In this case, the base defines at the bottom, in particular, an internal volume of the housing in which operating medium can be stored. The hand hole typically permits access to the internal volume, for example in order to carry out maintenance work.

According to one embodiment, the first receiver adopts a first angle relative to a flange plane and the second receiver adopts a second angle relative to the flange plane, the second angle being different from the first angle.

The flange cover is typically a closure for a hand hole of an operating medium container. Such a closure can be arranged, for example, on an upper face or on an inclined side surface of the operating medium container. Typically, the flange cover is sealingly positioned on the hand hole and fastened thereto. Thus forces due to any displacement of the conveyor unit, which might possibly occur, can be introduced via the guide bars into the flange cover and from the flange cover into the operating medium container.

A hand hole can have, in particular, a diameter of between 80 mm and 160 mm. For example, according to the SAE J2587 Standard, the diameters 130.5 mm, 115.5 mm or 95.5 mm can be used. During the operation of a motor vehicle, the hand hole is typically closed by the flange cover, but can be opened as required by removing the flange cover in order to permit access to the interior of the operating medium container.

A flange plane is typically a plane of a surface which is configured in or on the flange cover. In a preferred embodiment, an outer surface and/or inner surface of the flange cover extends entirely or at least substantially in the flange plane or parallel thereto. The flange plane, in particular, can also be parallel or identical to a plane which is spanned by a boundary of the hand hole which the flange cover closes.

The operating medium container forms, in particular, a storage volume for storing the operating medium. The operating medium container thus forms the substantially fluid-tight outer shell of the storage volume and defines the storage volume relative to the installation space. In the case of plastics containers, for example, this is referred to as the bubble. In the case of steel containers, the operating medium container can be configured, for example, from two metal shells. Advantageously, the operating medium container can have a saddle shape with a main chamber and a secondary chamber which are connected together via a connecting region.

By the formation of the flange cover with two receivers, which in particular can be respectively at different angles to the flange plane, it is achieved that the flange cover can be used on different operating medium containers which differ, in particular, relative to their angle of the hand hole, for example in comparison with a base plate or a substrate or base. This reduces the outlay required for variants to be produced and stocked. Thus the same flange cover can be used on different operating medium containers and the fastening function for the conveyor unit can still be achieved by way of the guide bars. In particular, the operating medium containers can have different housing geometries, as has already been described above.

Guide bars can be configured, in particular, in a rectilinear or straight manner. A more complex path, however, is also possible.

An angle of a receiver is typically the angle which a guide bar which is received in the receiver adopts relative to the flange plane. Typically, each receiver is designed such that it can receive a guide bar only at one angle. The angle of the guide bar to the flange plane is thus predetermined by the receiver.

According to a preferred embodiment, the receivers are oriented in a guide bar plane which is different and not parallel to the flange plane or oblique relative to the flange plane. The guide bar plane thus predetermines a plane in which the guide bars extend after being inserted into one of the receivers. Typically, in this case in an installed situation only one guide bar is present in each guide bar plane, since a receiver which corresponds to the angle of the hand hole of the operating medium container utilized is used for a guide bar. If a receiver is configured, for example, as a cylindrical recess, a longitudinal axis of the cylindrical recess can be located, in particular, in the guide bar plane. In principle, however, as an alternative to the orientation in a guide bar plane, a different orientation of the receivers, for example skewed, is also possible.

The guide bar plane can be located, in particular, transversely to the flange plane. In particular, this is understood to mean that the guide bar plane and the flange plane are arranged at right-angles to one another.

According to a preferred embodiment, in addition to the first receiver and the second receiver, at least one additional receiver is provided for receiving a guide bar of a third operating medium container in the flange cover. The third operating medium container differs, in particular, from the first operating medium container and from the second operating medium container regarding the housing geometries. The additional receiver can, in particular, adopt an angle relative to the flange plane which differs from the first angle and from the second angle. A plurality of additional receivers, or any number thereof, can also be configured in addition to the first receiver and the second receiver. The aforementioned receivers or additional receivers are thus typically at different angles. The first receiver, the second receiver and the additional receivers are preferably arranged along a straight path and/or are oriented in the same guide bar plane. Due to the additional receivers, the flange cover can be configured for more than two angles of a hand hole, as mentioned above, and provide a suitable receiver for each of the angles. This permits the adaptation to an even greater number of different housing geometries.

According to a preferred embodiment, further receivers are configured in the flange cover, wherein each further receiver is assigned to one of the receivers or the additional receiver or one of the additional receivers. As a result, a plurality of guide bars can be used at the same time, i.e. in particular at a specific angle of the hand hole. Typically, each guide bar is fastened to the conveyor unit opposite the flange cover. The fastening effect of the conveyor unit thus can be improved, without having to sacrifice the variability. However, a guide bar can also be supported, for example, on a base or a substrate of an operating medium container.

Thus the term "additional receivers" is understood to mean receivers which permit additional angles, in addition to the first and second receivers already mentioned in the introduction. This is why these additional receivers are also not necessarily denoted separately from the receivers. The term "further receivers" is understood to mean receivers which permit the fastening of more than one guide bar at a specific angle.

In principle, a plurality of further receivers can also be provided for each angle, for example for fastening more than two guide bars.

Preferably, each further receiver is oriented parallel to the assigned receiver. As a result, the two guide bars to be used at a specific angle of the hand hole are at the same angle or run parallel to one another in the installed state. However, different angles are also possible here.

The further receivers can also be oriented in a further guide bar plane. The further guide bar plane can, in particular, be parallel to the guide bar plane.

According to a preferred embodiment, each receiver spans a receiver plane with its assigned further receiver. The receiver plane thus is the plane in which the guide bars run when they are inserted into the receiver and the assigned further receiver. In particular, if the receivers and the further receivers are configured as cylindrical recesses, longitudinal axes of the cylindrical recesses can be located in the respective receiver plane.

Intersecting lines of the receiver planes with the flange plane are preferably located parallel to one another. As a result, an equivalent installed situation can be achieved for all angles of a hand hole.

The receivers are preferably configured as cylindrical recesses. This corresponds to a simple and expedient embodiment, since a guide bar which is typically cylindrical in its entirety, or at least on its end region, can be easily inserted and then remains at a predetermined angle therein. The recesses can also be respectively designed as a bore. The recesses can be already provided, for example, during the manufacture of the flange cover by way of injection-molding, by the corresponding shaping of a mold. This can apply to all receivers, but also only to one or a few receivers. In this case, the "receivers" are to be understood to mean all of the aforementioned receivers, i.e. also the additional receivers and further receivers.

The flange plane can be defined, in particular, by an edge of the hand hole. In particular, when the flange cover is positioned on a hand hole of an operating medium container, the flange cover can come into contact with the operating medium container on the edge. The connection between the flange cover and the operating medium container is typically sealed by this contact. This can be implemented, for example, by a seal, in particular an O-ring, between the edge and the operating medium container. Such a seal can be provided, for example, on the flange cover or on the operating medium container. In particular, an edge of the hand hole can be parallel to the edge of the operating medium container, and the two edges can adjoin one another directly in the installed state. A "defining" of the flange plane can be understood to mean, in particular, that the flange plane is parallel to the edge and/or directly adjoins this edge.

In particular, the receivers can adopt an angle to the flange plane of between 0° and 90°. For example, angles of 18° and 31° can be provided. Depending on the embodiment, however, other angles can also be used.

The technology disclosed herein also relates to a conveyor module arrangement, comprising (i) a conveyor module which is configured to be positioned on a base, (iii) one or more guide bars, and (iii) a flange cover as described herein, wherein one or more guide bars is fastened or are fastened to the conveyor module and engages or engage in a receiver, additional receiver or further receiver of the flange cover.

Thus advantageously the conveyor module can be fastened by way of the guide bars and the flange cover in an operating medium container. The already described variants can be applied relative to the flange cover.

In particular, each guide bar can engage in one respective receiver, wherein additional receivers or further receivers can also be understood thereby. In particular, a guide bar can engage in a receiver or additional receiver and a further guide bar can engage in an assigned further receiver. However, guide bars which are not fastened to the conveyor module and/or which do not engage in a receiver can also be present. These guide bars can be supported, for example, in another manner.

The technology disclosed herein further relates to an operating medium container, comprising (i) a housing in which the hand hole is configured, and (ii) a conveyor module arrangement as described herein, wherein the flange cover closes the hand hole and the conveyor module is positioned on a base of the housing.

A conveyor module can be advantageously fastened in the operating medium container by way of such an operating medium container, as already described. In particular, the conveyor module can be positioned on the base so that, for example, it would slip to the side without a guide bar. Such a slippage is prevented by the guide bar. According to one embodiment, a bracing of the conveyor module can also be provided by the flange cover. To this end, for example, a resilient element, for example a spring, can be assigned to a guide bar and exert a force which is oriented toward the base.

The guide bar or guide bars can be oriented, in particular, transversely to the base of the operating medium container. This can mean, in particular, that the guide bars are oriented along a vertical axis or vertically in a motor vehicle.

The base can be designed, for example, to be planar and can be horizontal in the installed state in a motor vehicle. Other embodiments, however, are also possible.

According to a preferred embodiment, a surge tank is provided in the operating medium container, wherein the conveyor module is arranged in the surge tank. As a result, it can be ensured that, even in the case of low filling levels of the operating medium container, the immediate surroundings of the conveyor module are filled with operating medium. Surge tanks are typically actively filled.

A surge tank preferably has at least one feed for conveying the operating medium. The surge tank is generally arranged on the base of the operating medium container and extends in the direction of a motor vehicle vertical axis. The surge tank serves to store a specific volume of operating medium which is conveyed by a pump which is arranged in the operating medium container, preferably in the surge tank, to any operating medium consumers. It is also conceivable that the pump is arranged outside the operating medium container for storing the liquid operating medium. The volume of the surge tank is typically very small compared to the storage volume of the operating medium container. For example, the volume of the surge tank can be smaller than the storage volume of the operating medium container at least by a factor of 10, preferably at least by a factor of 50, and particularly preferably at least by a factor of 100. A feed for the inlet of operating medium into the surge tank is provided on the base of the surge tank. Preferably, an element of the operating medium pump can be provided directly adjacent to the feed. This element can be, for example, the operating medium pump itself or a suction point which is fluidically connected to the operating medium pump.

It is possible that the conveyor module is not fastened, in particular, by a material connection to the base. For example, this can mean that a material connection, which could be generated for example by welding, is not present between the conveyor module and the base.

The technology disclosed herein further relates to a modular operating medium container system, comprising (i) a first operating medium container, as described herein, with a first housing geometry, and (ii) a second operating medium container, as described herein, with a second housing geometry which is different from the first housing geometry. As a result, different housing geometries can be used, wherein it is sufficient to stock a single type of flange cover.

In other words, guide bars can be fitted in any position by introducing different receivers at different angles in the flange cover. As a result, the number of variants of flange cover is reduced. Example: the same flange cover can receive guide bars for a tank or operating medium container at an inclination of, for example, 18° and 31°.

The technology disclosed herein is now described with reference to the figures.

DETAILED DESCRIPTION OF THE DRAWINGS

Figure 1:
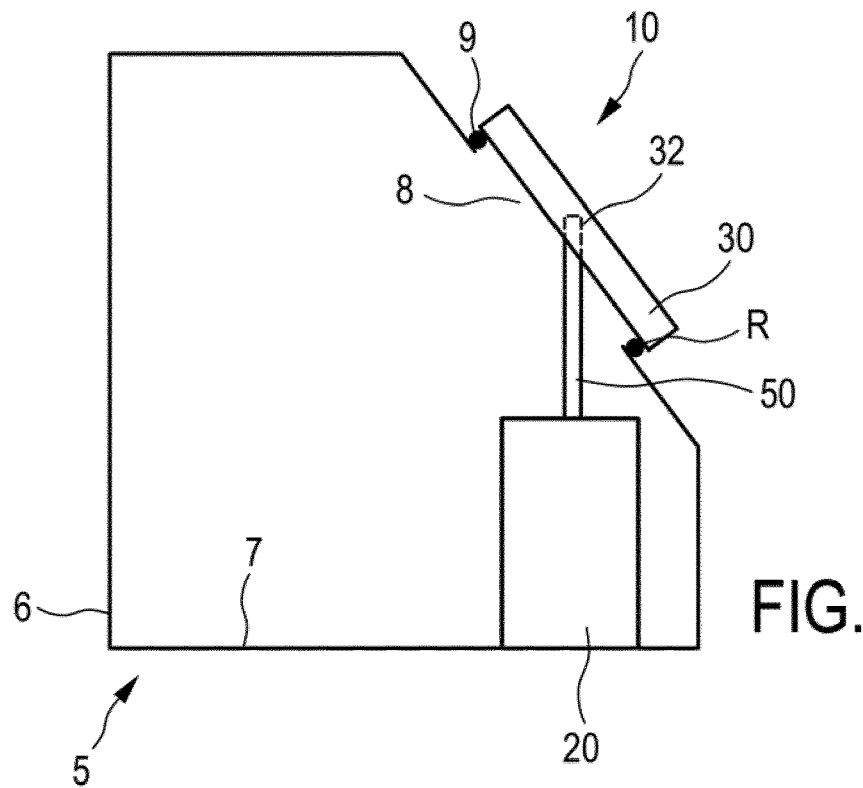
FIG. 1 shows an operating medium container according to a first exemplary embodiment.

FIG. 1 shows purely schematically an operating medium container 5 according to an exemplary embodiment in a lateral cross-sectional view. The operating medium container 5 has a housing 6 for storing liquid operating medium, for example fuel. The operating medium container also has a conveyor module arrangement 10.

The conveyor module arrangement 10 has a conveyor module 20 in which components such as a fuel pump and a filter can be located. The conveyor module 20 is arranged in the interior of the housing 6, without having to be fastened to the base 7 thereof.

The conveyor module arrangement 10 has a flange cover 30. This flange cover closes a hand hole 8 of the operating medium container 5 and is sealed by way of an annular seal 9 relative to the operating medium container 5. The annular seal 9 in this case forms at its contact region with the flange cover 30 an edge R of the hand hole 8.

A receiver 32 is configured in the flange cover 30, and namely as a cylindrical recess. This receiver 32 is denoted below as the second receiver.

The conveyor module arrangement 10 also has a guide bar 50. This guide bar is fastened to the conveyor module 20, as shown, and received in the receiver 32. The guide bar is also fastened therein. As a result, a fastening of the conveyor module 20 to the flange cover 30 is achieved via the guide bar 50. Since the flange cover 30 in turn is fastened to the housing 6, ultimately the conveyor module 20 is thus also fastened to the housing 6. In the present case, the guide bar runs vertically and transversely to the base 7.

It should be understood that in typical embodiments not only the guide bar 50 but also at least one further guide bar, which is not visible, is present. This guide bar is then typically received in a further receiver assigned to the receiver 32, as described further below with reference to FIG. 3, and is also fastened to the conveyor module 20. The guide bar is located directly behind the guide bar 50 which is visible.

Figure 2:
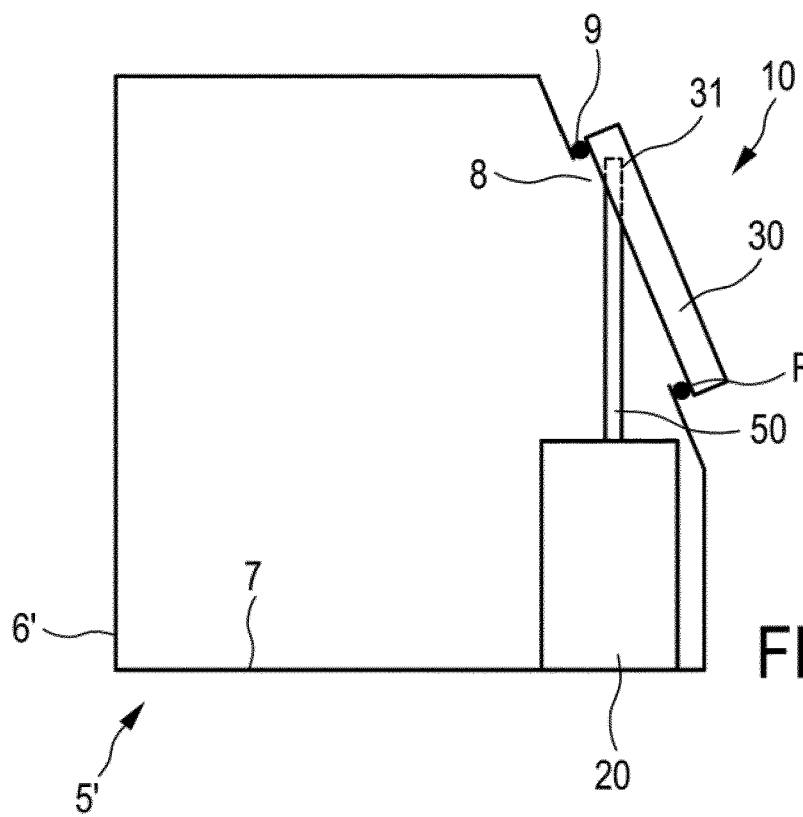
FIG. 2 shows an operating medium container according to a second exemplary embodiment.

In the embodiment according to FIG. 1, the flange cover 30 adopts an angle of approximately 45° relative to the base 7 of the housing 6. This is predetermined by the hand hole 8. The embodiment according to FIG. 2 is identical apart from this angle which is steeper relative to that of FIG. 1. Accordingly, the guide bar 50 is not received in the aforementioned second receiver 32 but in a first receiver 31, which is at an angle which is different and suitable for this situation. The reference signs of the operating medium container and housing are denoted in FIG. 2 by an apostrophe, i.e. 5' or 6', in order to emphasize the different housing geometry thereof in comparison with FIG. 1. Since the other components are not structurally different, they are not denoted by an apostrophe.

Figure 3:
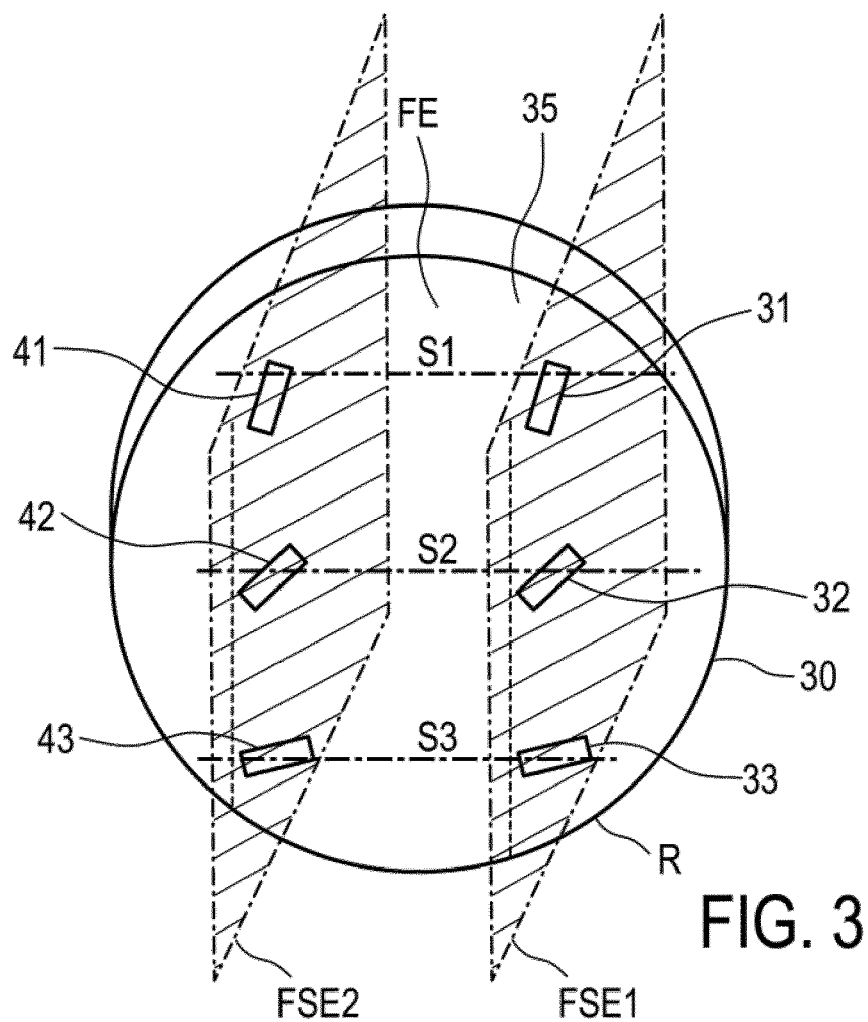
FIG. 3 shows a flange cover in a perspective view.
Figure 4:
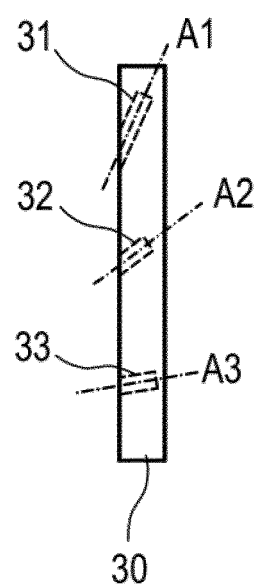
FIG. 4 shows the flange cover in a side view.

FIG. 3 shows the flange cover 30 in a perspective view from the interior of the operating medium container 6. FIG. 4 shows the flange cover 30 in a lateral cross-sectional view. The geometric relationships are explained with reference to these two figures.

The flange cover 30 has an inner surface 35 which defines a flange plane FE. The edge R, which in the installed state is in contact with the annular seal 9 and also defines the flange plane FE, is located radially externally on the surface

35. In the installed state, the edge R is identical to the edge R of the hand hole 8. The first receiver 31, the second receiver 32 and an additional third receiver 33 are oriented as respective cylindrical recesses in a first guide bar plane FSE1, which is perpendicular to the flange plane FE. Guide bars which are received in one of the receivers 31, 32, 33 run in the first guide bar plane FSE1. The receivers 31, 32, 33 are in each case at a different angle to the flange plane FE in order to be adapted to different angles of a hand hole 8, as already mentioned above.

Moreover, a further first receiver 41, a further second receiver 42 and a further third receiver 43 are also arranged in the flange cover 30. The further first receiver 41 in this case is assigned to the first receiver 31 and is at the same angle relative to the flange plane FE. The further second receiver 42 is assigned to the second receiver 32 and is at the same angle relative to the flange plane FE. The further third receiver 43 is assigned to the third receiver 33 and is at the same angle relative to the flange plane FE. In a typical installed situation, a guide bar is received in one of the receivers 31, 32, 33 and a further guide bar is received in the assigned receiver 41, 42, 43. The guide bars in this case are also located in a second guide bar plane FSE2 in which the further receivers 41, 42, 43 run and which is parallel to the first guide bar plane FSE1.

Due to the same angles of the receiver 31, 32, 33 and the assigned further receiver 41, 42, 43 in each case, these receivers in each case span a receiver plane or are located therein. These receiver planes A1, A2, A3 are illustrated in FIG. 4, where they extend transversely to the drawing plane, since the view of these planes would overload FIG. 3. Intersecting lines S1, S2, S3 of the receiver planes A1, A2, A3 with the flange plane PE are in turn illustrated in FIG. 3. The intersecting lines are located parallel to one another, as shown. As a result, with a suitably attached flange cover, the guide bars are received at the same height.

A component which can be used for different operating medium containers 5, in particular those having different angles of hand hole 8 or having different housing geometries, and which nevertheless permits a fastening of a conveyor unit 20 by way of guide bars 50, is produced by way of the flange cover 30 described herein.

For reasons of legibility, the expression "at least one" has been omitted in some cases for the sake of simplicity. If a feature of the technology disclosed herein is described in the singular or by the indefinite article (for example, the/a flange cover, the/a guide bar, etc.) at the same time a plurality thereof is also intended to be disclosed therewith (for example, the at least one flange cover, the at least one guide bar, etc.)

The above description of the present invention serves only for illustrative purposes and not for the purpose of limiting the invention. Within the context of the invention various changes and modifications are possible without departing from the scope of the invention and its equivalents.

The invention claimed is:

1. A flange cover for closing a hand hole, the flange cover comprising:
 a first receiver for receiving a first guide bar of a first operating medium container; and
 a second receiver for receiving a second guide bar of a second operating medium container,
 wherein the first operating medium container and the second operating medium container have different housing geometries.

2. The flange cover according to claim 1,
 wherein the first receiver adopts a first angle relative to a flange plane and the second receiver adopts a second angle relative to the flange plane, the second angle being different from the first angle.

3. The flange cover according to claim 2, wherein the first receiver and second receiver are oriented in a guide bar plane which is oblique relative to the flange plane.

4. The flange cover according to claim 3, wherein the guide bar plane is located transversely to the flange plane.

5. The flange cover according to claim 3, further comprising:
 a third receiver for receiving a third guide bar of a third operating medium container,
 wherein the third operating medium container has a different housing geometry from the housing geometries of the first operating medium container and the second operating medium container.

6. The flange cover according to claim 5, wherein:
 the third receiver adopts an angle relative to the flange plane which differs from the first angle and from the second angle; and/or
 the third receiver is oriented in the guide bar plane.

7. The flange cover according to claim 5, further comprising:
 a plurality of further receivers,
 wherein each further receiver of the plurality of further receivers is assigned to one of the first receiver, the second receiver, or the third receiver.

8. The flange cover according to claim 7, wherein each further receiver of the plurality of further receivers is oriented parallel to the respective assigned receiver.

9. The flange cover according to claim 7, wherein each further receiver of the plurality of further receivers spans a receiver plane with the respective assigned receiver.

10. The flange cover according to claim 9, wherein intersecting lines of the receiver planes with the flange plane are parallel to one another.

11. The flange cover according to claim 7, wherein each of the first receiver, the second receiver, the third receiver, and the plurality of further receivers is configured as a cylindrical recess.

12. The flange cover according to claim 2, wherein the flange plane is defined by an edge of the hand hole.

13. A conveyor module arrangement comprising
 a conveyor module which is configured to be positioned on a base,
 one or more guide bars, and
 the flange cover according to claim 7,
 wherein each of one or more guide bars is fastened to the conveyor module and engages in the first receiver, thee second receiver, the third receiver, or one of the plurality of receivers of the flange cover.

14. An operating medium container comprising:
 a housing in which the hand hole is configured, and
 the conveyor module arrangement according to claim 13,
 wherein the flange cover closes the hand hole and the conveyor module is positioned on the base of the housing.

15. The operating medium container according to claim 14, wherein:
 a surge tank is provided in the operating medium container, and
 the conveyor module is arranged in the surge tank.

16. The operating medium container according to claim 14, wherein the conveyor module is not fastened by a material connection to the base.

17. A modular operating medium container system comprising:
a first operating medium container and a second operating medium container according to claim 14.

* * * * *